(12) United States Patent
Adamczyk et al.

(10) Patent No.: US 6,290,047 B1
(45) Date of Patent: Sep. 18, 2001

(54) PARKING PAWL ASSEMBLY

(75) Inventors: David William Adamczyk, Livonia; John D. Borders, White Lake; Daniel Hugh Hildebrand, Livonia; Ernest Russell Shedd, Plymouth, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/488,312

(22) Filed: Jan. 20, 2000

(51) Int. Cl.[7] .............................. B60T 1/06; B60K 41/26
(52) U.S. Cl. ............................. 192/219.5; 188/31
(58) Field of Search ..................... 192/219.5; 188/31, 188/69, 68; 74/411.5, 577 S, 577 R

(56) References Cited

U.S. PATENT DOCUMENTS

| | | |
|---|---|---|
| 4,585,103 | 4/1986 | Kuwayama et al. . |
| 4,606,242 | 8/1986 | Hasegawa et al. . |
| 4,610,337 | 9/1986 | Kuwayama et al. . |
| 4,614,256 | 9/1986 | Kuwayama et al. . |
| 5,964,335 | * 10/1999 | Taniguchi et al. ............... 192/219.5 |

FOREIGN PATENT DOCUMENTS 58-191630 * 11/1983 (JP) .
WO 9725231 7/1997 (WO) .

* cited by examiner

Primary Examiner—Rodney H. Bonck
(74) Attorney, Agent, or Firm—Ford Global Tech., Inc.

(57) ABSTRACT

A parking pawl assembly 10 is provided for use in combination with a vehicle of the type including a transmission assembly 12 having an output shaft 14, a park gear 16, and a shifter or shifting assembly 18, which is operatively and selectively used to actuate a conventional park rod 20 in a known and conventional manner. The parking pawl assembly 10 includes a selectively and pivotally movable pawl member 22, a generally cylindrical hub member 24, which is fixedly coupled to park gear 16, a cam assembly 26, which is fixedly coupled to pawl member 22 and which abuttingly engages hub member 24, and a return spring 28 which is operatively coupled to cam assembly 26. Cam assembly 26 ensures that pawl member 22 consistently engages park gear 16 at a relatively constant speed, and further ensures that a spring 42 within park rod 20 is compressed each time the transmission 12 is shifted into "park".

13 Claims, 4 Drawing Sheets

PARKING PAWL ASSEMBLY

FIELD OF THE INVENTION

This invention relates to a parking pawl assembly and more particularly, to a parking pawl assembly having a selectively rotatable cam assembly which ensures that consistent loads are provided to the vehicle's shifter each time the vehicle is shifted into "park".

BACKGROUND OF THE INVENTION

Parking pawl assemblies are used in automotive vehicles to operatively engage the vehicle's park gear, thereby maintaining the vehicle in a "parked" position or state. Parking pawl assemblies typically include a rotatable member or a "parking pawl," which is selectively engaged by the park rod of the vehicle when the transmission of the vehicle is shifted into the "park" position. When the park rod engages the parking pawl, the parking pawl pivots or rotates into a position where it is disposed between a pair of teeth on the park gear, thereby substantially preventing the park gear and the output shaft from further rotating.

The park rod typically includes a spring which is compressed during certain "shifts" into park. Particularly, when the park rod engages the parking pawl and causes it to pivot into the park gear, the parking pawl is sometimes pivoted into and engages a "tooth" of the park gear. During these types of shifts, the pivotal movement of the parking pawl is temporarily limited or stopped by the gear tooth, and is effective to prevent further movement of the park rod until the park gear is rotated, thereby causing the spring within the park rod to be compressed. When the park gear rotates, the parking pawl slides along the gear tooth with which it is engaged until it "drops into" or is forced into a space between the teeth of the park gear.

During other shifts into the park position, the parking pawl is engaged by the park rod and is rotated or pivoted directly into a space between gear teeth. During these types of shifts, the parking pawl does not "block" or prevent the movement of the park rod and the spring within the park rod is not compressed.

The resulting inconsistency in the compression of the park rod causes the force required to shift the vehicle into park to vary from shift to shift. Hence, in these prior systems a driver or an operator of the shifter undesirably "feels" or experiences different forces when shifting the vehicle into park (e.g., the operator is required to exert different amounts or levels of force at the shifter to shift the vehicle into park during different shifts).

Additionally, the speed at which the pawl "drops into" or engages space between gear teeth varies from shift to shift in these prior systems. For example and without limitation, when the parking pawl first engages a tooth of the park gear and subsequently "drops into" or is forced into a space between gear teeth, the speed at which the parking pawl engages the gear teeth depends, at least in part, upon the speed at which the park gear rotates. This speed varies based upon the incline of the vehicle, the speed of the vehicle, and the residual torque remaining within the output shaft of the vehicle when the vehicle is shifted into park. These variables cause the parking pawl to "drop into" position or to engage the teeth of the park gear undesirably fast during certain shifts, thereby producing unaesthetic "clicking" or "clicking" sounds.

There is therefore a need for a new and improved parking pawl assembly for use in a vehicle which overcomes many, if not all, of the previously delineated drawbacks of such prior parking pawl assemblies.

SUMMARY OF THE INVENTION

It is a first object of the invention to provide a parking pawl assembly which overcomes at least some of the previously delineated drawbacks of prior parking pawl assemblies.

It is a second object of the invention to provide a parking pawl assembly which causes the park rod to be compressed each time the vehicle is shifted into park.

It is a third object of the invention to provide a parking pawl assembly which provides for a consistent load at the vehicle's shifter assembly each time the vehicle is shifted into park.

It is a fourth object of the invention to provide a parking pawl assembly which engages the park gear at a relatively consistent speed each time the vehicle is shifted into park.

According to a first aspect of the present invention, a parking pawl assembly is provided for use in combination with a vehicle of the type having a park gear, a shifter assembly which is movable to a park position, and a park rod having a selectively compressible spring. The park rod is coupled to the shifter and is actuatable in response to the movement of the shifter to the park position. The parking pawl assembly includes a pawl member which abuts the park rod. The pawl member is selectively movable between a first position in which the pawl member is remote from the park gear, and a second position, in which the pawl member engages the park gear. The pawl member is movable from the first to the second position in response to the actuation of the park rod. The parking pawl assembly further includes a generally cylindrical member which is coupled to the park gear, and a cam assembly which is coupled to the pawl member. The cam assembly includes a movable cam member which abuttingly engages the generally cylindrical member, and is effective to hold the pawl member in the first position until the spring is compressed, thereby causing the spring to be compressed substantially every time the shifter moves to the park position.

According to a second aspect of the present invention, a method for providing a consistent force at a shifter within a vehicle each time the shifter is moved into a park position is provided. The shifter includes a park gear, a parking pawl which selectively engages the park gear, and a park rod having a selectively compressible spring and being movable in response to the shifting of the shifter. The method includes the steps of: providing a hub member; coupling the hub member to the park gear; providing a cam assembly which is movable between a first position and a second position; coupling the cam assembly to the parking pawl so that the cam assembly abuts the hub member and is effective to prevent the parking pawl from engaging the park gear while the cam assembly is in the first position, and to allow the parking pawl to engage the park gear while the cam assembly is in the second position; and moving the cam assembly from the first position to the second position only after the shifter is moved to the park position and the spring has been compressed.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
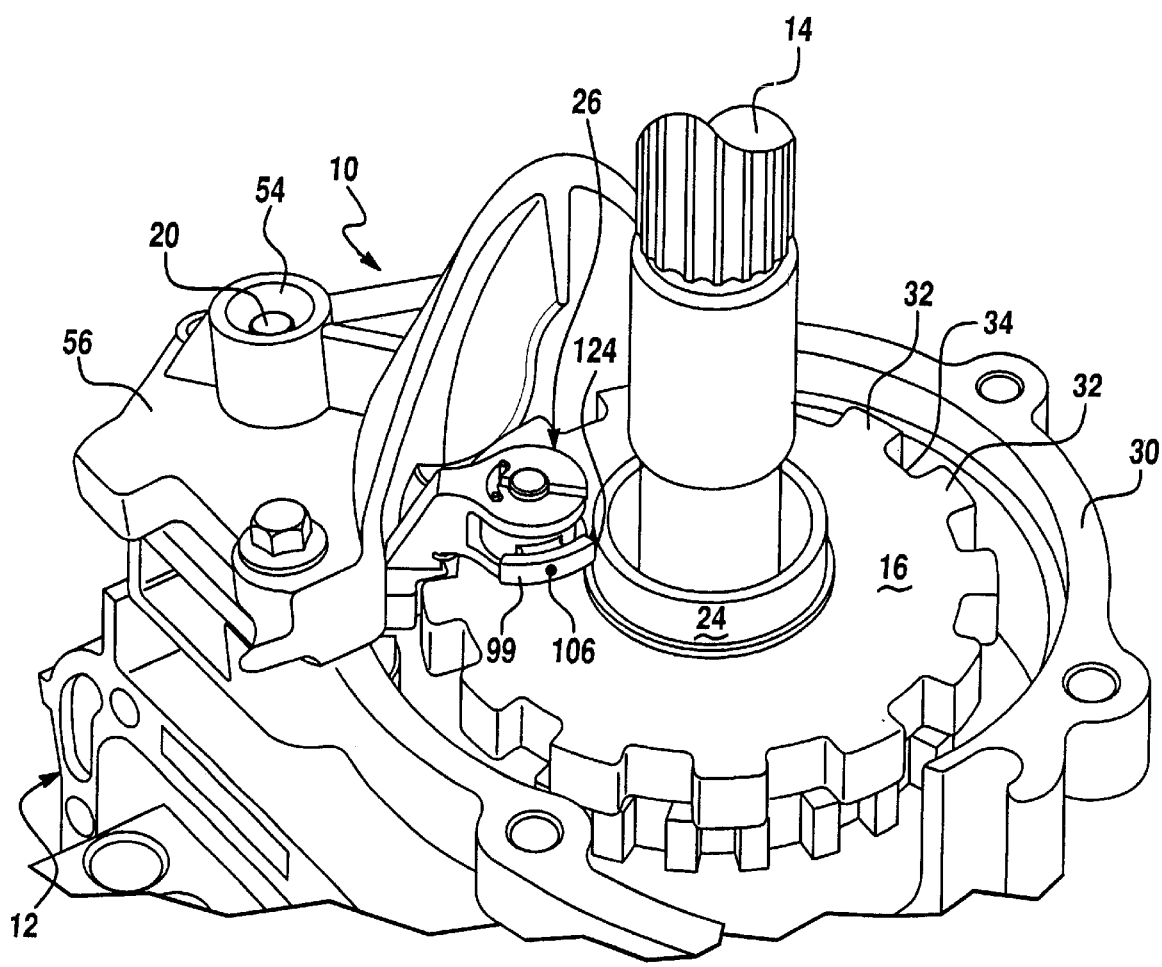
FIG. 1 is a partial perspective view of a parking pawl assembly, which is made in accordance with the teachings of the preferred embodiment of the invention, and which is deployed within a conventional transmission assembly.

Referring now to FIGS. 1–4, there is shown a parking pawl assembly 10, which is made in accordance with the teachings of the preferred embodiment of the invention. Assembly 10 is adapted for use in combination with a vehicle of the type having a transmission assembly 12, an output shaft 14, which provides an output torque from the vehicle's engine, a park gear 16, which is coupled to output shaft 14, a shifter or shifting assembly 18, and a park rod 20, which is coupled to shifting assembly 18. Shifting assembly 18 is operatively and selectively movable between several positions, such as a "park" position, a "reverse" position, a "neutral" position, and a "drive" position, which respectively correspond to various operating states or operating modes of the vehicle. Shifting assembly 18 selectively actuates or moves park rod 20 in a known and conventional manner when the vehicle is shifted into park.

Parking pawl assembly 10 includes a selectively and pivotally movable pawl member 22, a generally cylindrical hub member 24, a cam assembly 26, which is fixedly coupled to pawl member 22 and which abuttingly engages hub member 24, and a return spring 28 which is operatively coupled to cam assembly 26.

Transmission assembly 12 is a conventional and commercially available transmission assembly having a housing 30, which operatively contains various components, including but not limited to parking pawl assembly 10, output shaft 14, park gear 16, and park rod 20.

Park gear 16 is a conventional park gear which is fixedly coupled to the vehicle's output shaft 14, and which selectively rotates with output shaft 14 about the longitudinal axis 15 of output shaft 14. Park gear 16 includes a plurality of peripherally disposed and substantially identical teeth or projecting portions 32. Each tooth 32 is separated by a cavity or recessed portion 34. As described more fully and completely below, pawl member 22 selectively engages and/or resides within a unique one of cavities 34, thereby substantially preventing the output shaft 14 and park gear 16 from rotating, and maintaining the vehicle in a stationary or "parked" position.

Park rod 20 is a conventional and generally elongated park rod. Park rod 20 includes a top portion 36, a "widened" and generally cylindrical portion 38 having an interior channel 40, a spring member 42 which is operatively disposed within channel 40, and a bottom portion 44 which is operatively and conventionally coupled to shifting assembly 18. Top portion 36 is slidably disposed within a generally cylindrical channel 54 which is integrally formed within portion 56 of housing 30. Portion 38 includes an integrally formed, "sloped", and/or tapered portion 58 which is adjacent to portion 36. Portion 44 includes an end portion 46, which is slidably disposed within channel 40, and which abuttingly engages end 48 of spring member 42. End 50 of spring member 42 abuts the top end 52 of channel 40. Park rod 20 is selectively movable in the directions of arrows 60 and 62 in a conventional manner by use of shifting assembly 18. As explained more fully and completely below, when the shifting assembly 18 is moved into the "park" position, rod 20 moves in the direction of arrow 60 from the position illustrated in FIG. 3 to the position illustrated in FIG. 4.

Figure 2:
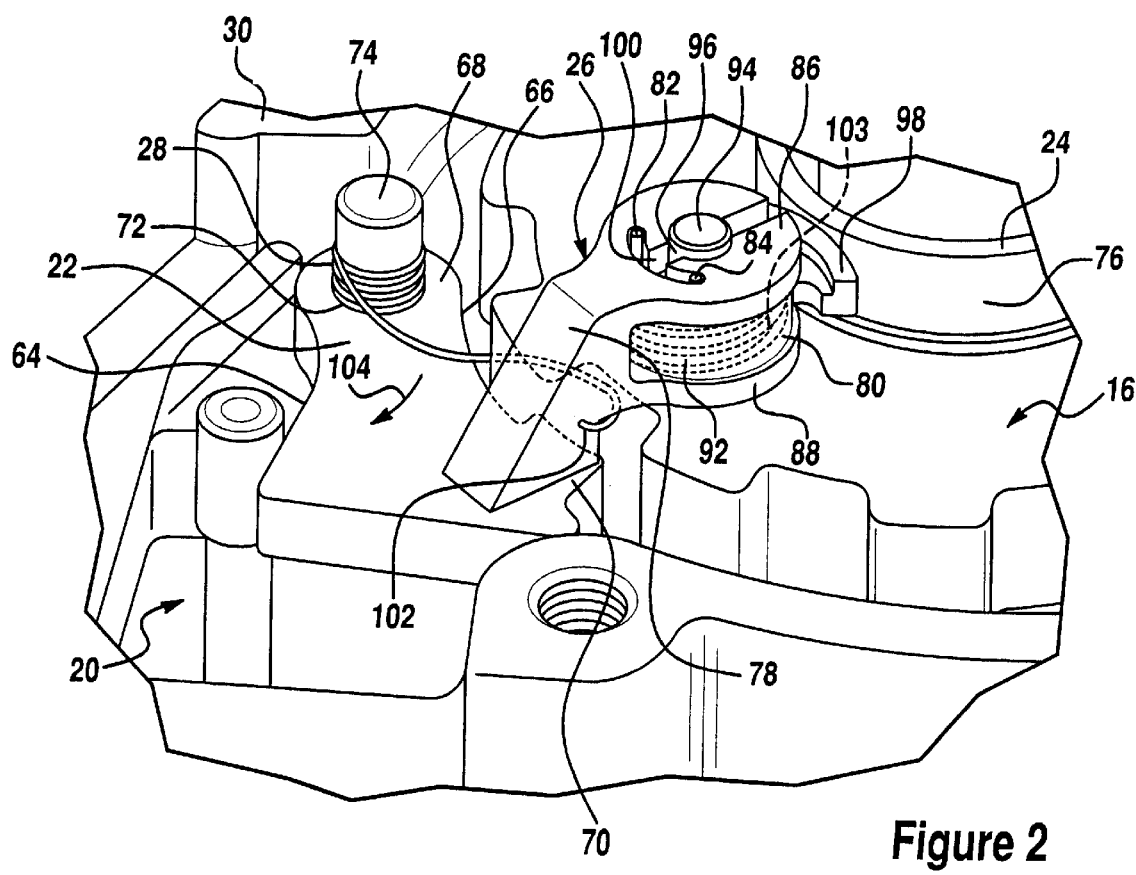
FIG. 2 is a perspective view of the parking pawl assembly shown in FIG. 1 with a portion of the transmission housing removed.

As shown best in FIG. 2, pawl member 22 includes a rod engaging side or surface 64, which abuttingly engages park rod 20, a gear engaging side or surface 66, and a generally rounded end portion 68. Side or surface 66 includes a generally rectangular tooth or projecting portion 70 which selectively engages park gear 16. Rounded end portion 68 includes a generally circular aperture 72, and is pivotally coupled to a rod 74 which is integrally formed with housing 30 and which operatively extends through aperture 72.

Hub member 24 includes a generally cylindrical and smooth outer surface 76. Hub 24 is fixedly coupled to park gear 16 and rotates with park gear 16 and output shaft 14. In one non-limiting embodiment, hub 24 is fixedly coupled to output shaft 14.

Figure 3:
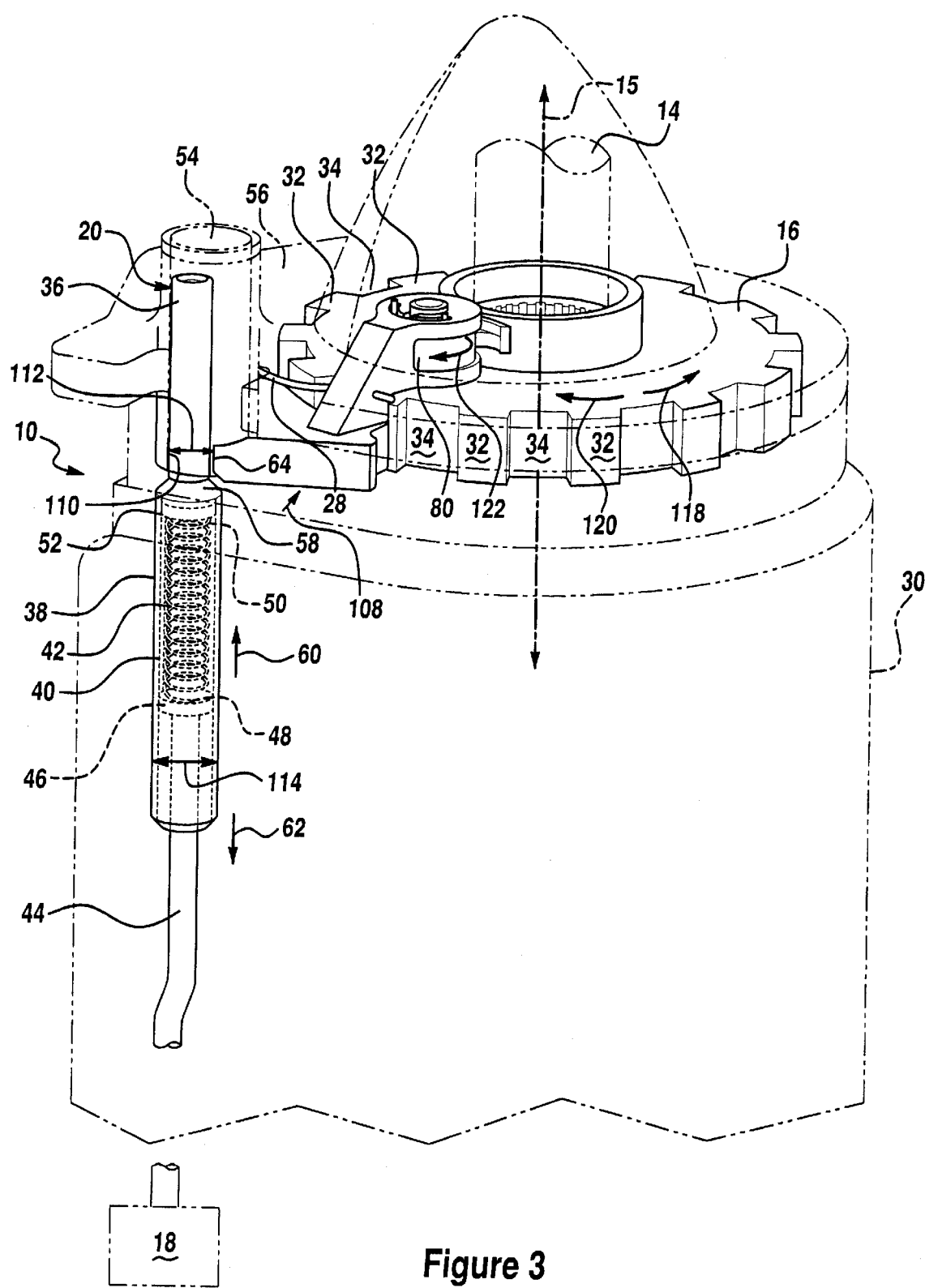
FIG. 3 is a perspective view of the parking pawl assembly shown in FIG. 1 in an unengaged position or state.

Cam assembly 26 includes an arm or support member 78, a selectively rotatable cam member 80, and a pair of conventional torsional springs 82, 84. Support member 78 is conventionally and fixedly coupled to pawl member 22 and includes a top plate or portion 86 and a bottom plate or portion 88. Cam member 80 includes a generally round body portion 92 which is rotatably disposed between plates 86, 88. A generally cylindrical projection or pin member 94 extends from body portion 92 and is rotatably engaged within an aperture or channel 96 formed within member 86, thereby holding body portion 92 between plates 86, 88 and allowing cam member 80 to rotate with respect to plates 86, 88. Member 80 further includes a semi-circular or crescent-shaped hub-engaging portion 98 which has an outer surface 99 which abuttingly engages surface 76 of hub 24. Springs 82, 84 are operatively disposed within a generally circular channel 103 formed within body portion 92. One end of each spring 82, 84 is forcibly and abuttingly engaged within channel 103 which is formed within portion 86 of member 78, and an opposite end (not shown) of each spring 82, 84 is conventionally coupled to body portion 92 (e.g., by welding, fastening or otherwise connecting springs 82, 84 to portion 92). Springs 82, 84 cooperatively provide forces which "resist" or oppose or counter any rotation of member 80 which is in a direction away from the centered or "at rest" position of member 80 which is illustrated in FIGS. 1 and 3 (i.e., the force(s) provided by springs 82, 84 are always in a direction opposite to the direction of rotation of member 80 when member 80 is being rotated away from its "centered" position). In the preferred embodiment of the invention, springs 82, 84 are conventional coil-type torsional springs. In other alternate embodiments, springs 82, 84 may comprise other types of springs.

Spring member 28 is a conventional return spring which is wrapped or coupled around rod member 74. Spring 28 includes an end 102 which is operatively and conventionally coupled to arm or support portion 78 of cam assembly 26. Spring member 28 provides and/or imparts a force upon cam assembly 26 in the direction illustrated by arrow 104.

In operation, parking pawl assembly 10 resides in the position illustrated in FIGS. 1 and 3 when the vehicle is in an operating state or condition other than park (e.g., if the vehicle is in reverse, neutral or drive). As illustrated in FIGS. 2 and 3, while assembly 10 resides in this position, portion 98 of cam member 80 abuttingly engages surface 76 of hub 24, and is substantially "centered" with respect to hub 76 and with respect to support member 78 (e.g., the symmetrical "center" 106 of outer surface 99 contacts surface 76). Furthermore, while in "park," tooth or wheel engaging portion 70 of pawl member 22 is not in contact with park gear 16.

When the vehicle and/or transmission 12 is shifted into the "park" position, shifter 18 causes the park rod 20 to move in the direction illustrated by arrow 60. As rod 20 moves in the direction of arrow 60, portion 58 engages side 64 of pawl member 22. The engagement between portion 58 and member 22 imparts a force upon member 22 in the direction illustrated by arrow 108. Because of the abutting engagement between portion 98 of cam assembly 26 and surface 76 of hub 24, the pivotal movement of pawl member 22 in the direction of arrow 108 is temporarily prevented or resisted. Because the space or distance 112 between inner surface 110 of channel 54 and the side 64 of pawl member 22 is less than the diameter 114 of rod portion 38 when pawl member 22 is in the position illustrated in FIGS. 1 and 3, portion 38 is prevented from moving further in the direction of arrow 60. The force which is exerted on rod portion 44 by shifter 18 causes portion 44 to move relative to portion 38 in the direction of arrow 60, thereby compressing the park rod spring 42. Since portion 98 remains in abutting engagement with hub 24 during every shift to "park", the present assembly 10 ensures that the park rod spring 42 is compressed each time the vehicle is shifted into "park".

Figure 4:
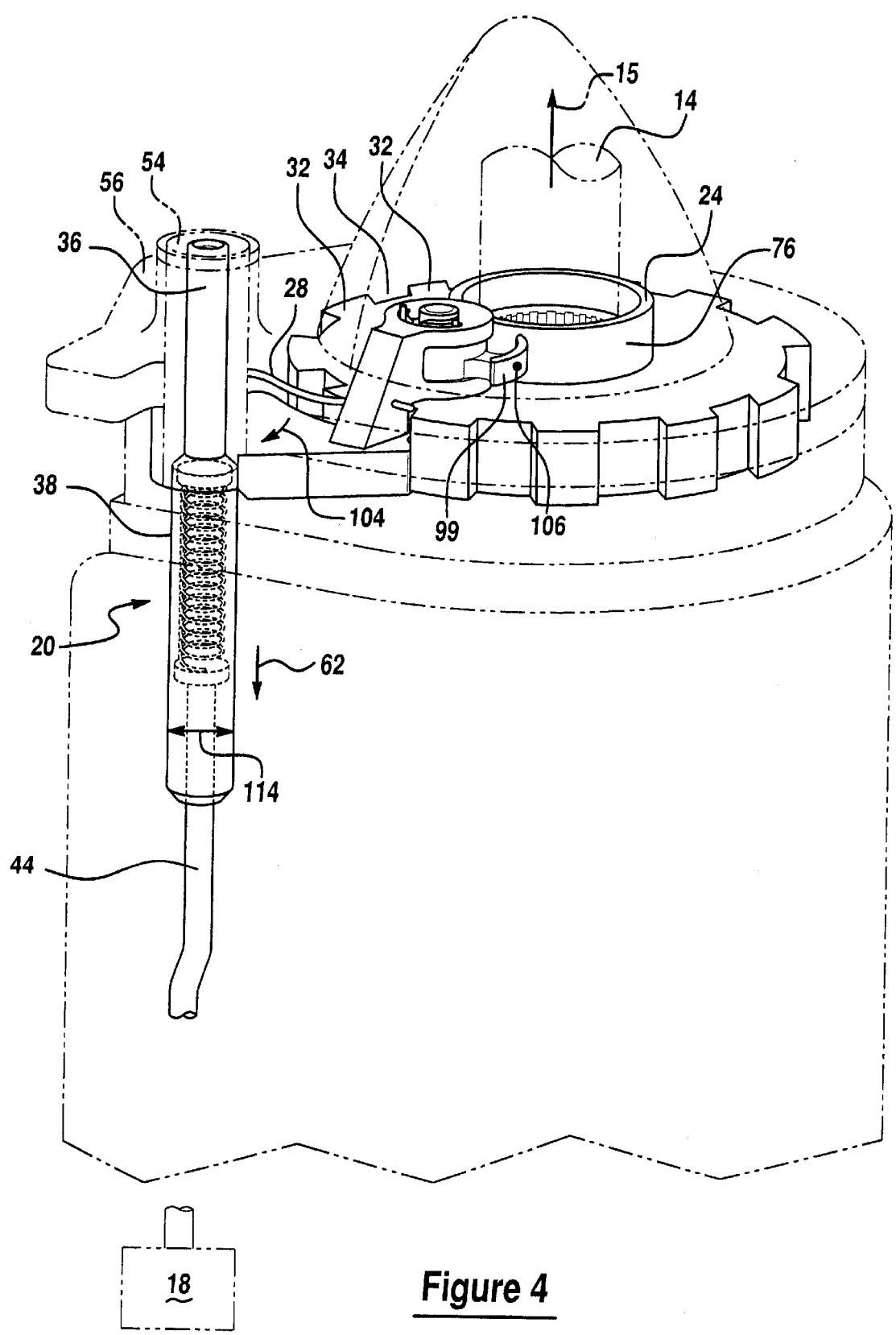
FIG. 4 is a perspective view of the parking pawl assembly shown in FIG. 1 in an engaged position or state.

Once the vehicle has been shifted into "park", any residual torque remaining within the output shaft 14 and/or any "rolling" movements of the vehicle or vehicle tires, will cause the output shaft 14, the park gear 16 and hub 24 to selectively rotate in the direction of arrow 118 and/or arrow 120. As park gear 16 rotates, the engagement between portion 98 and hub 24 causes member 80 to rotate. For example and without limitation, as park gear 16 and hub 24 rotate in the direction of arrow 118, member 80 is rotated in the direction of arrow 122. It should be appreciated that pawl member 22 is prevented from moving further in the direction of 108 and from engaging park gear 16 as long as curved surface 99 remains in contact with hub surface 76. Once end 124 of portion 98 abuts surface 76, the force provided by rod 20 on pawl member 22 and the further rotation of member 80 cause the pawl member 22 and assembly 26 to move in the direction of arrow 108 and causes pawl member 22 to engage park gear 16, as illustrated in FIG. 4. The forces provided by spring members 82, 84 control the speed and force at which pawl member 22 engages park gear 16, and more particularly, the forces control the speed and force at which tooth or portion 70 of pawl member 22 engages a tooth 32 or a recessed portion 34 of park gear 16. It should be appreciated that during this process, if portion 70 is forced into or contacts a tooth 32 of gear 16, the rotation of member 80 will temporarily stop and the portion 70 will "slide" along or against tooth 32 until portion 70 is aligned with a space 34 (i.e., until the rotation of park gear 16 causes a space 34 to be aligned with portion 70). Once portion 70 is aligned with a space 34, it will "drop into" or engage the space 34 at a relatively constant speed which is dependent upon the strength or spring constant "k" of springs 82, 84. When pawl member 22 is fully engaged with park gear 16 (i.e., when portion 70 is operatively engaged within a space 34), as illustrated in FIGS. 2 and 4, pawl member 22 substantially prevents park gear 16 and output shaft 14 from further rotating either in direction 118 or in direction 120. It should be appreciated that cam assembly 26 and pawl member 22 will operate in a substantially similar manner during shifts in which park gear 16 is rotated in the direction of arrow 120.

When the vehicle and/or transmission is shifted out of "park," shifter 18 moves park rod 20 in the direction of arrow 62. As rod 20 moves in the direction of arrow 62, portion 38 moves out of channel 54. Once portion 38 is out of channel 54, the force provided by return spring 28 in the direction of arrow 108 causes member 22 to move in the direction of arrow 104, thereby pivoting or rotating back into its "original" position, as illustrated in FIGS. 1 and 3. As member 22 moves back into its original position, the force provided by springs 82, 84 cause member 80 to pivot or rotate back into its "original" or "centered" position.

In this manner, each time shifter assembly 18 is shifted into park, portion 98 of cam assembly 26 will be abuttingly engaged with hub 24, thereby forcing spring member 42 within park rod 20 to be compressed and providing a substantially consistent "shifting" force. Additionally, the function of cam assembly 26 further ensures that pawl member 22 will engage park gear 16 at a relatively consistent speed and with a relatively constant force, thereby eliminating any undesirable "clicking" or "clicking" sounds associated with prior parking pawl assemblies.

It is to be understood that the invention is not to be limited to the exact construction and/or method which has been illustrated and discussed above, but that various changes and/or modifications may be made without departing from the spirit and the scope of the invention.

What is claimed is:

1. A parking assembly comprising:

a selectively rotatable park gear;

a shifter assembly, which is selectively movable to a park position; and a parking pawl assembly including a first member which is selectively movable between a first position, in which said first member is remote from said park gear, and a second position, in which said first member engages said park gear effective to prevent said park gear from rotating, said first member being movable from said first to said second position when said shifter assembly is moved to said park position, a hub which is coupled to said park gear, and a cam assembly which is coupled to said first member, said cam assembly including a cam member which abuttingly engages said hub, said cam member being selectively movable, in response to said rotation of said park gear, from a third position to a fourth position, said movement from said third position to said fourth position being effective to cause said first member to move from said first position to said second position at a relatively consistent speed each time said shifter assembly is moved to said park position.

2. The parking pawl assembly of claim 1 wherein said shifter assembly comprises a park rod which engages said first member, thereby causing said first member to move from said third position to said forth position when said shifter assembly moves from said first position to said second position.

3. The parking pawl assembly of claim 2 wherein said park rod comprises a spring which is compressed when said park rod engages said first member.

4. The parking pawl assembly of claim 3 wherein said spring is effective to cause said cam member to move from said fourth position to said third position when said shifter assembly is moved out of said park position.

5. The parking pawl assembly of claim 1 wherein said shifter assembly includes a park rod which is movable into a fifth position when said shifter assembly is moved to said park position, said movement of said park rod into said fifth position being effective to cause said first member to move from said first position to said second position.

6. The parking pawl assembly of claim 5 wherein said park rod comprises a first portion and a second portion, said first portion being coupled to said second portion by way of a spring, and wherein said first member and said cam assembly cooperatively cause said spring to be compressed substantially every time said shifter is moved to said park position.

7. The parking pawl assembly of claim 1 wherein said hub is generally cylindrical.

8. The parking pawl assembly of claim 7 wherein said cam member includes a crescent shaped portion which engages said hub.

9. A method for providing a consistent force at a shifter within a vehicle each time said shifter is moved into a park position, said shifter including a park gear, a parking pawl which selectively engages said park gear, and a park rod having a selectively compressible spring and being movable in response to said shifting of said shifter, said method comprising the steps of:

providing a hub member;

coupling said hub member to said park gear;

providing a cam assembly which is movable between a first position and a second position;

coupling said cam assembly to said parking pawl effective to cause said cam assembly to abut said hub member, thereby preventing said parking pawl from engaging said park gear while said cam assembly is in said first position and allowing said parking pawl to engage said park gear while said cam assembly is in said second position; and moving said cam assembly from said first position to said second position only after said shifter is moved to said park position and said spring has been compressed.

10. The method of claim 9 wherein said cam assembly comprises a spring member which is effective to cause said cam assembly to move from said second position to said first position when said shifter is moved out of said park position.

11. The method of claim 10 wherein said spring member is further effective to cause said parking pawl to engage said parking gear at a relatively consistent speed each time said shifter is moved to said park position.

12. The method of claim 11 wherein said hub member includes a generally cylindrical surface and wherein said cam assembly includes a cam member having a crescent shaped portion which engages said generally cylindrical surface of said hub member.

13. The method of claim 12 wherein said cam assembly further includes a support member which is fixedly coupled to said parking pawl and which rotatably supports said cam member.

* * * * *